April 4, 1950      J. B. MANGAN      2,503,057
LAWN MOWER ATTACHMENT FOR ERADICATING WEEDS
Filed May 27, 1946      3 Sheets-Sheet 1
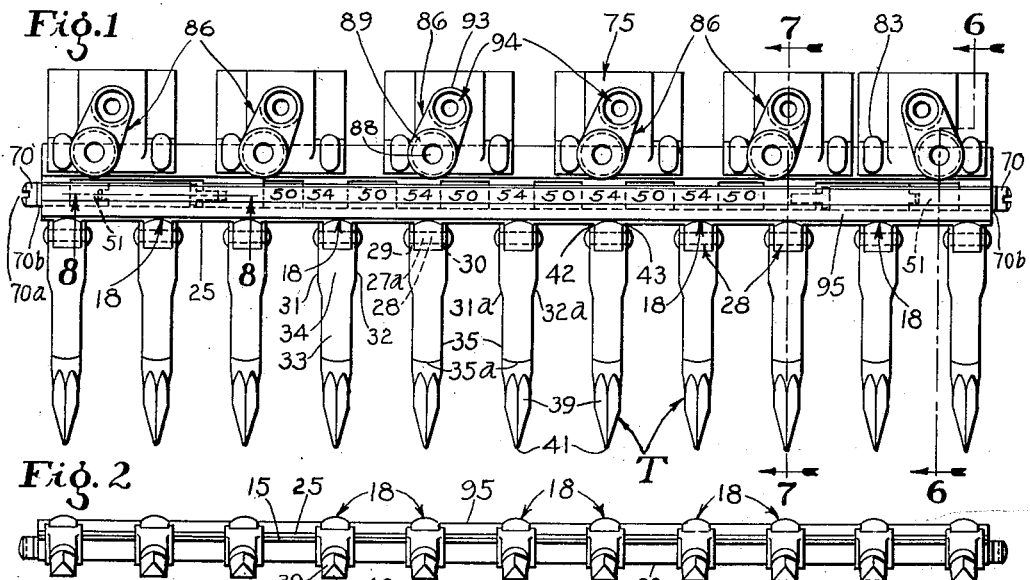
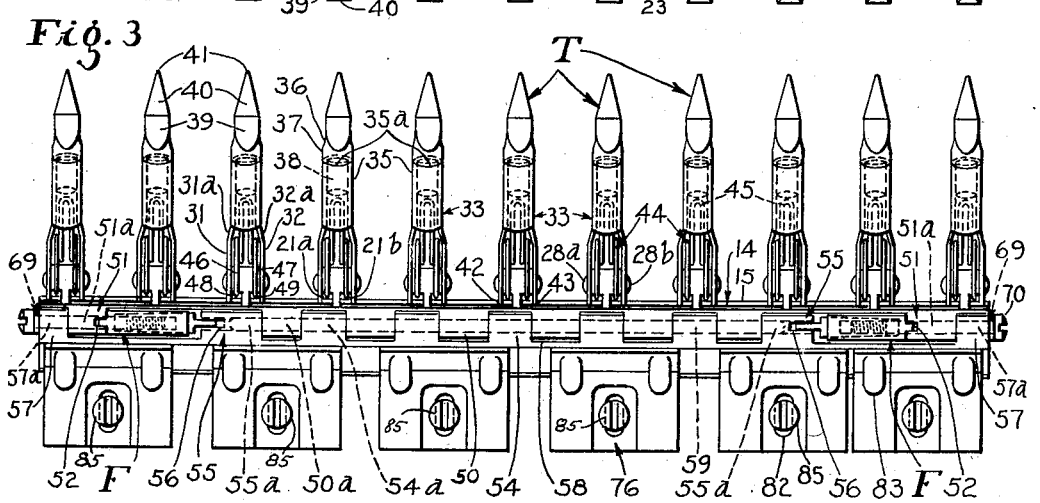
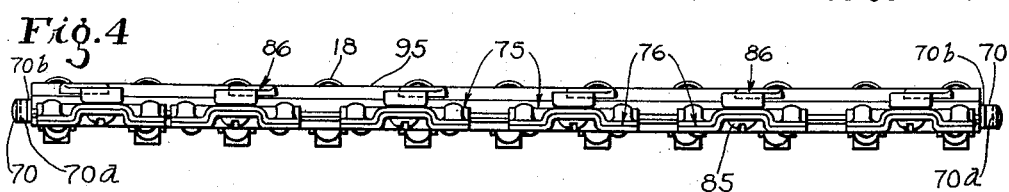
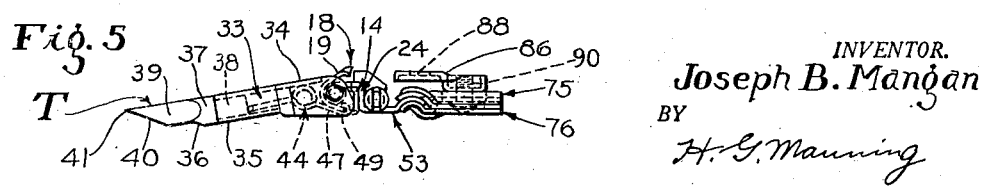
INVENTOR.
Joseph B. Mangan
BY
H. G. Manning

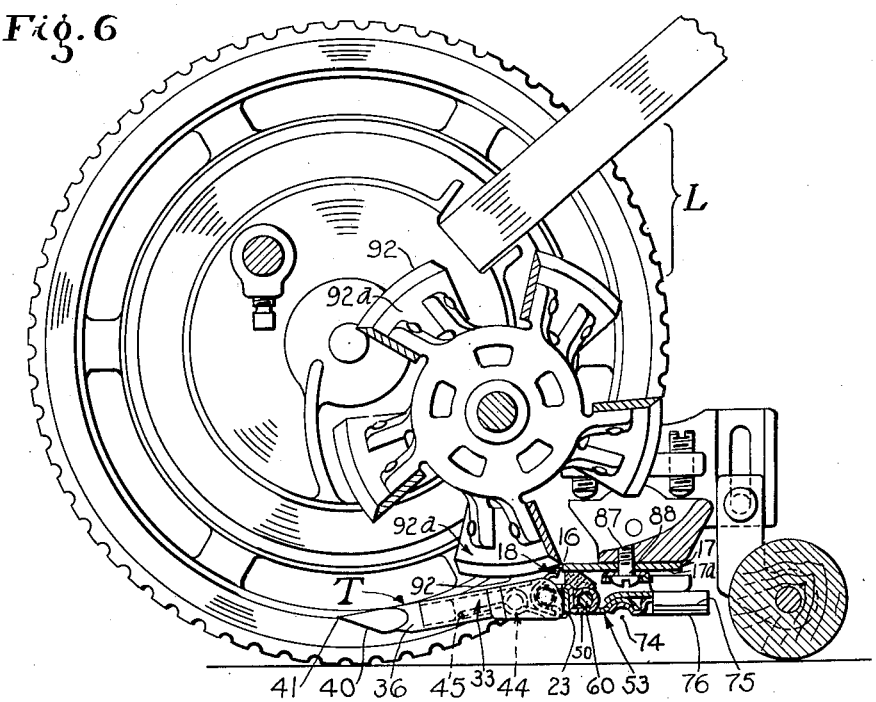
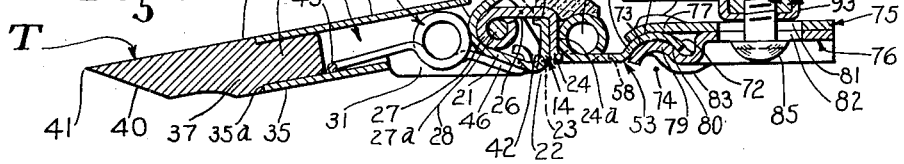
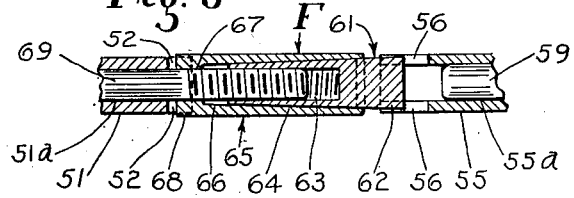

April 4, 1950 J. B. MANGAN 2,503,057
LAWN MOWER ATTACHMENT FOR ERADICATING WEEDS
Filed May 27, 1946 3 Sheets-Sheet 3

INVENTOR.
Joseph B. Mangan
BY
H. G. Manning

Patented Apr. 4, 1950

2,503,057

UNITED STATES PATENT OFFICE 2,503,057

LAWN MOWER ATTACHMENT FOR ERADICATING WEEDS

Joseph B. Mangan, Wethersfield, Conn.

Application May 27, 1946, Serial No. 672,359

10 Claims. (Cl. 56—249)

This invention relates to lawn care apparatus, and more particularly to an attachment to a conventional lawn mower for destroying and controlling low-lying weeds and obnoxious plants, while at the same time insuring that the grass will be mowed to a uniform height.

One object of this invention is to provide an attachment of the above nature which may be used for combing the lawn immediately in front of the mower knives, so that the leaves and stems of the grass and weeds will be raised to and held in a vertical position and supported until cut off by the mower to a uniform height.

A further object is to provide an attachment of the above nature which will be applicable to various types and sizes of lawn mowers, both manual and power-operated, and which may either be installed in the lawn mower at the time of its manufacture or attached thereto at a later time.

A further object is to provide an attachment of the above nature having means for adjusting the working height of the comb teeth independently of the adjustment of the cutting height of the shear bar of the lawn mower.

A further object is to provide an attachment of the above nature having means for quickly and easily securing it as a unit to the lawn mower without disturbing the relative positions of the various parts of said mower.

A further object is to provide an attachment of the above nature having resilient means to permit the comb teeth to operate close to the turf without causing undue drag upon the ground even on rough and uneven terrain.

A further object is to provide a device of the above nature wherein the means provided for attaching it to the bottom knife bracket of the mower will cause no material change in the degree of flexibility of said bottom knife.

A still further object is to provide a device of the above nature having means whereby the comb teeth may be adjustably supported at a minimum vertical distance from the ground level, and having means to limit the downward movement thereof, thus avoiding the digging or scraping of the ground by the flexible comb teeth.

A still further object is to provide a device of the above nature wherein spring means are provided for returning the comb teeth automatically to their normal lower positions after being upwardly deflected.

A still further object is to provide an attachment of the above nature, which may be easily adjusted in position to compensate for variations in the height of the mowing cutter, the types of bottom-knife fastening means, the angle between the lower surface of the bottom-knife and the ground level, and the density of the turf.

A still further object is to provide an attachment of the above nature having adjustable flexible means for closing the space between the bottom knife of the mower and the comb bar for the purpose of excluding cut grass and other foreign objects from said space.

Another object is to provide a device of the above nature wherein the points of the comb teeth are shaped to permit them to penetrate easily between and under the leaves and stems of grass and weeds and to avoid accumulating grass or trash on their leading portions.

A still further object is to provide an attachment of the above nature which will be simple in construction, inexpensive to manufacture, easy to install and manipulate, compact, ornamental in appearance, and very efficient and durable in use.

With these and other objects in view, there has been illustrated on the accompanying drawings one form in which the invention may conveniently be embodied in practice.

In the drawings,

Fig. 1 represents a top plan view of the present invention, showing the attachment unit by itself.

Fig. 2 is a front elevation of the same.

Fig. 3 is a bottom plan view of the same.

Fig. 4 is a rear elevation of the same.

Fig. 5 is an end view of the same.

Fig. 6 is a sectional view, in side elevation, taken along the broken line 6—6 of Fig. 1, looking in the direction of the arrows, and showing the appearance of the attachment when installed upon a lawn mower of conventional design.

Fig. 7 is a sectional view in side elevation, on an enlarged scale, through one of the comb teeth and its associated bracket, taken along the line 7—7 of Fig. 1.

Fig. 8 is a longitudinal sectional view, on an enlarged scale, in front elevation, taken along the line 8—8 of Fig. 1, showing the construction of the friction clutch which prevents the comb bar unit from angular displacement relative to the comb bar connector.

Figure 9:
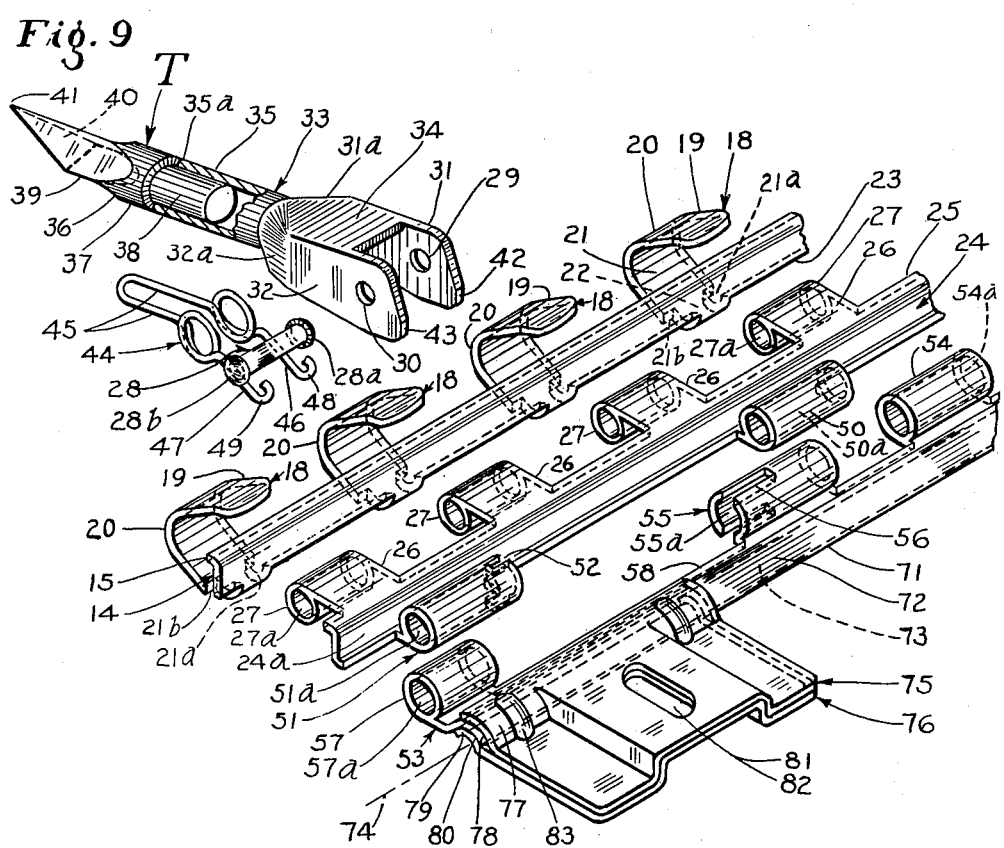
Fig. 9 is an exploded isometric view, on an enlarged scale, showing the various parts of the attachment in separated relation.

This invention is an improvement over the invention disclosed in my prior application Serial Number 576,380, filed February 6, 1945, entitled "Weed eradicating attachment for lawn mowers," now Patent 2,465,543, granted March 29, 1949.

Conventional lawn mowers as previously manufactured, do not maintain a lawn in perfect condition, because of the fact that the turf and grass will be injured if the mower is adjusted low enough to cut the low-growing weeds such as crab grass.

It is well-known that the growth of grass and other leafy plants is largely dependent upon the photosynthetic activity of the leaves thereof, this activity being proportional to the area of the leaves. Thus, grass plants which are mowed uniformly long, will develop a greater root system and take in more water and plant nutrients for the benefit of the grass than those which are mowed at a lower height. Moreover, weeds, such as dandelion, plantain, etc., which naturally have a large leaf area, may be eradicated if their large leaves and stems are cut off short and prevented from growing. Other obnoxious plants, such as crab grass and low prostrate weeds such as mallow and money-wort, which are dependent for their existence and perpetuation upon their vine-like growth and/or the production of seeds, may be controlled and eventually destroyed and removed from the lawn if their branches and seed heads are prevented from developing.

Referring now to the drawings in which like reference numerals denote corresponding parts throughout the several views, the attachment embodying the present invention is provided with a comb bar 14, the length of which is approximately equal to the width of the swath cut by the lawn mower—the leading edge 15 of said bar 14 being located approximately in line with the cutting edge 16 of the bottom knife 17 of the lawn mower L.

The present attachment is provided with a plurality of uniformly spaced comb tooth units T, eleven of which are herein shown, and will be hereinafter more fully described. Since the construction and operation of all of said comb tooth units T are exactly alike, it will be necessary to give a detailed description of only one of said units.

Integral with the comb bar 14 are a plurality of uniformly spaced tooth-engaging crowns 18, each of which is provided with an inclined portion 19, a circular portion 20, an inclined portion 21, and a reduced curved portion 22 which merges into the lower edge 23 of said comb bar 14. The curved portion 22 of each tooth crown 18 is provided with a pair of opposed rectangular recesses 21a, 21b.

Fixed (as by spot-welding) to the comb bar 14 is a knuckle bar 24, the length of which is substantially the same as the length of said comb bar 14. The knuckle bar 24 is provided with an integral forwardly-extending, reinforcing rib 25 whose leading edge coincides with the leading edge 15 of said comb bar 14.

Extending forwardly from the leading edge of the reinforcing rib 25 are a plurality of integral knuckle arms 26 which terminate in the tooth knuckles 27 which are embraced by the adjacent comb tooth crowns 18.

The knuckles 27 are each provided with a cylindrical aperture 27a extending axially throughout its length. A cylindrical pivot pin 28 passes through each circular aperture 27a, and has its end portions fixedly engaged in suitable apertures 29, 30 which are provided in a pair of vertical side members 31, 32 of a tooth shank 33. Each pivot pin 28 is provided with a pair of semispherical heads 28a, 28b which serve to retain it in position in the tooth shank 33.

The shank 33 of each comb tooth unit T is provided with an inclined rear top member 34 integral with and connected to the vertical side members 31, 32 of said tooth shank 33. The tooth shank 33 is also provided with intermediate tapered sides 31a, 32a and a hollow forward cylindrical portion 35, which terminates in a circular forward edge 35a.

The tooth 36 of each comb tooth unit T is provided with a cylindrical rear portion 37 flush with the hollow cylindrical portion 35 of the tooth shank 33, and having a reduced rear cylindrical shank member 38 fitted into said cylindrical portion 35. The tooth 36 also has a triangular point 39 provided with an upwardly inclined bottom surface 40 and a sharp tip 41. Each tooth shank 33 is provided with rear parallel shoulder members 42, 43 which normally abut against the forward surface of the comb bar 14.

A wire torque spring 44 having a forward loop 45 serves to engage the lower inside surface of the hollow cylindrical portion 35 of each tooth shank 33. The torque spring 44 is further provided with a pair of rear inclined arms 46, 47 which terminate in a pair of upcurled hook members 48, 49.

The hook members 48, 49 of the torque spring 44 engage the inclined portion 21 of the tooth crown 18 and are located adjacent the recesses 21a, 21b thereof.

The torque spring 44 is so constructed so that it will exert a downward pressure upon the tooth shank 33, thus urging the comb tooth unit T to swing about the pivot pin 28, and to assume the normal lowermost position, shown in Figs. 6 and 7, wherein the rear shoulder members 42, 43 of the tooth shank 33 abut against the forward surface of the comb bar 14.

In order to permit the normal ground clearance height of the comb teeth to be adjusted whenever desired, provision is made of a hinge joint 60 to be hereinafter more fully described.

The knuckle bar 24 is provided with a plurality of integral intermediate hinge knuckles 50 (Fig. 9), six of which are herein shown. The knuckle bar 24 is also provided with a pair of integral hinge knuckles 51, 51 adjacent the end of said bar having end slots 52, 52. The hinge knuckles 50, 51, extend rearwardly from the rear surface 24a of the knuckle bar 24 and are provided with cylindrical passages 50a, 51a, respectively, whose axes are approximately parallel with said rear surface 24a.

Pivotally secured to the knuckle bar 24 is a rear connector member 53, the length of which is substantially equal to the length of the comb bar 14. The connector member 53 is provided with a plurality of forwardly extending intermediate hinge knuckles 54, five of which are herein shown, a pair of hinge knckles 55, 55, having open slots 56, 56, and a pair of outer hinge knuckles 57, 57. The hinge knuckles 54, 55 which are integral with the connector member 53 are offset upwardly and forwardly from the leading edge 58 of said member 53, and are provided with cylindrical apertures 54a, 55a, 57a, respectively, which apertures have their axes approximately in alignment.

In order to pivotally align the hinge knuckles 50 and 54 of the knuckle bar 24 and comb bar connector 53, respectively, provision is made of an elongated hinge pin 59, pivotally carried within the cylindrical apertures 50a, 54a of said knuckles 50, 54, extending throughout substantially seven comb tooth units.

Whenever it is necessary to prevent flexing of the hinge joint 60, in order to fix the comb teeth 36 at the desired normal ground clearance, provision is made of a pair of friction clutch units F, which will be now described—one of which is located adjacent each end of the comb bar 14.

Thus, each clutch units F comprises a clutch cone 61 having an end tang 62 which slidably engages in one of the slots 56 of the hinge knuckles 55 of the connector 53. The clutch cone 61 is further provided with an internally threaded hole 63 surrounded by an outer conical portion 64.

A clutch sleeve 65 is located in alignment with each clutch cone 61 and is provided with a socket 66 tapered to fit with the conical portions 64 of the clutch cones 61.

Each clutch sleeve 65 is further provided with a cylindrical aperture 67 and a tang 68 for engaging in the slots 52, 52 of the hinge knuckles 51 of the knuckle bar 24. The conical portions 64 and the tapered sockets 66 of the clutch members should preferably be provided with a taper of not more than one-half inch per foot in order to secure maximum frictional holding power.

A pair of screws 69, 69 are provided for adjustably securing the clutch cones 61, 61 in the coinciding clutch sleeves 65, 65. The screws 69, 69 are provided with outer heads 70, 70 having screw-driver slots 70a, 70a.

The heads 70, 70 of the screws 69, 69 abut against lock washers 70b which in turn abut against the outer ends of the knuckles 57, 57 of the connector member 53. The bodies of the screws 69 extend through the end knuckles 57, 57, through the knuckles 51, 51 of the knuckle bar 24, and also through the cylindrical apertures 67, 67 of the clutch sleeves 65, 65. By means of this construction, when the screws 69 are turned in the proper direction, the clutch cones 61 will be pulled outwardly into the clutch sleeves and will cause the friction clutch units F to hold the comb bar 14 and the connector member 53 securely in adjusted positions.

*Tooth height adjustment*

Means are provided for adjusting the height of the tooth crowns 18 of the comb bar 14 with relation to the cutting edge 16 of the bottom knife 17 irrespective of the normal height of the comb teeth 36. Thus the rear connector member 53 is provided with a rear arcuate section 71 having upper and lower surfaces 72, 73, said surfaces being approximately semi-circular in shape and having a common center line 74. By means of this construction, it will be seen that partial rotation of the rear arcuate section 71 of the connector 53 about its center line 74 will change the vertical position of the tooth-engaging crowns 18.

Provision is also made of means for adjusting the position of the comb bar tooth crowns 18 in a plane parallel with the lower surface 17a of the mower knife 17. This is accomplished by providing a plurality of pairs of two-part brackets, six of which are herein shown, each consisting of an upper bracket 75 and a lower bracket 76. Each upper bracket 75 is provided with an arcuate forward portion 77, the lower surface 78 of which coincides with the upper surface 72 of the arcuate section 71 of the connector 53. Each lower bracket 76 is provided with an arcuate forward portion 79, the upper surface 80 of which coincides with the lower surface 73 of the arcuate segment 71 of the connector 53.

The connector member 53 is adjustably secured in position by clamping the arcuate section 71 thereof between the arcuate portions 77, 79 of the brackets 75, 76, which are provided with short transverse raised reinforcing ribs 83.

The brackets 75, 76 are also provided with aligned elongated transverse slots 81, 82 adapted to receive screws 84, six of which are herein shown. Each screw 84 is provided with a slotted round bottom head 85, by means of which it may be secured to an adaptor bracket 86 associated therewith (see Figs. 5 and 7). It will be seen that tightening of the screws 84 will cause the brackets 75, 76 to securely grip the arcuate portion 71 of the connector 53.

It will also be understood that the elongated slots 81, 82 in the brackets 75, 76 will permit the entire comb bar and tooth assembly to be adjusted transversely in a plane parallel with the lower surface 17a of the bottom mower knife 17.

In order to compensate for the various methods of attaching the mower bottom knife to the bottom bracket as practiced by different manufacturers, a plurality of adaptor attachments 85 may be arranged to suit the various locations and quantities of fastening screws.

Each adaptor 86 may further be provided with a cupped rear end 93 in which is secured a nut 94 having an internally threaded hole 90, to enable the brackets 75, 76 to be adjustably secured in position.

Provision may also be made of an elongated flexible protective pad 95, the length of which is substantially equal to that of the comb bar 14—said pad being of a soft material such as sponge rubber, and serving to adjustably fill the space between the bottom knife and the forward part of the attachment.

One advantage of the present invention is that the weeder attachment may be secured to the mower without removing the bottom knife of the lawn mower L or changing the normal position thereof.

An additional important advantage is secured by provision of means whereby the area, location and amount of pressure against the bottom knife is not altered by the securing of the weeding attachment in position.

This feature is of importance since in some types of mowers the bottom knife is made somewhat resilient in order to permit it to yeld in accordance with the pressure of the edges 92 of the rotatable blades 92a.

*Operation*

In operation, after the attachment has been installed, the lawn mower will be operated in the manner usually employed for mowing a lawn. As the mover is moved forwardly over the lawn, the points 41 of the comb tooth units T will penetrate between and under the low-lying leaves and branches of the weeds and grasses, causing them to be lifted and supported by the upwardly inclined upper surfaces of said comb teeth units. It will thus be seen that the weeds will be lifted within the path of the cutting edges of the mower knives and will be severed from their stems and thrown backwardly by the rotating blades of the mower. The cuttings may be collected in a grass catcher, not shown.

In assembling the attachment one of the bottom knife fastening screws 87 will be removed from its lawn mower and inserted through the aperture 88 in the recessed forward portion 89 of one of the adaptors 86.

The adaptor 86 will then be swung about the mower screws 87 to a position wherein the adaptor hole 90 is located at a predetermined convenient distance from the cutting edge of the bottom knife 17, and then the screw 87 will be tightened to securely hold the adaptor 86 in position. All of the other bottom knife fastening screws 87 wil lthen be successively removed, the adaptors 86 assembled and the screws 87 tightened in the same manner as above disclosed. By removing and replacing each screw 87 while the other screws remain tight, it will be seen that the bottom knife will not be moved or disturbed from its normal position.

In other words, since the upper surface 91 of the recessed end portion 89 of each adaptor 86 has approximately the same area as the upper surface of the head of the bottom knife fastening screw 87, the pressure of the attachment will be confined to the same location and area as in the original mower.

It will thus be seen that no metal parts of the attachment except the upper surface 91 of the adaptor brackets 86 normally touch the lower surface of the bottom knife or cause upward pressure upon it.

While there has been disclosed in this specification one form in which the invention may conveniently be embodied, it is to be understood that this form is shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a weed eradicating means for a lawn mower, means for raising low-lying weeds into position to be cut by said mower, said weed-raising means consisting of a comb bar, a plurality of forwardly-extending, grass-penetrating teeth connected to said bar, and intermediate connecting means hinged to both said comb bar and to said mower.

2. The invention as defined in claim 1, in which said comb bar is secured to the frame of said mower by an intermediate hinged knuckle bar and a connecting means connected to said knuckle bar.

3. The invention as defined in claim 1, in which said comb bar is secured to said mower by multiple pivotal and slidable connections to permit the vertical and horizontal position of the grass-penetrating teeth to be adjusted.

4. In a weed eradicating means for a lawn mower, a forward tooth-holding comb bar, a plurality of knuckles connected to said comb bar, each of said knuckles having a grass-penetrating tooth pivotally attached thereto, upwardly-extending forward tooth crowns adjacent the rear portions of said teeth, and means for connecting said comb bar to said mower.

5. The invention as defined in claim 4, in which said knuckles are fitted into said tooth crowns, pivot pins are provided for connecting said teeth with said knuckles, and said pivot pins are further provided with means to retain them in engagement with said teeth and said knuckles.

6. The invention as defined in claim 1, in which said connecting means is detachably secured to the mower frame by a plurality of adaptor members which are connected to said connecting means and said mower, respectively.

7. The invention as defined in claim 1, in which said hinged connecting means are adjustably secured to the comb bar by means of cooperating frictional clutch members.

8. The invention as defined in claim 4, in which means are provided for independently adjusting the height and the lateral position of the tooth crowns with relation to the cutting edge of the mower knife.

9. In a weed eradicating means for a lawn mower, means for raising low-lying weeds into position to be cut by said mower, said weed-raising means consisting of a comb bar, a plurality of forwardly-extending, grass-penetrating teeth connected to said bar and means for securing said bar to said mower in a position below the bottom knife of said mower, said securing means having provision for permitting said bottom knife to flexibly engage the rotatable blades of said mower.

10. The invention as defined in claim 9, in which said securing means consists of a plurality of fastening members adjacent the lower face of said bottom knife, said fastening members being provided with means to press against a relatively small portion of the area of said lower face of said bottom knife.

JOSEPH B. MANGAN.

REFERENCES CITED

The following references are of record in the file of this patent:

UNITED STATES PATENTS

| Number | Name | Date |
| --- | --- | --- |
| 955,261 | Gooding | Apr. 19, 1910 |
| 1,225,380 | Warren | May 8, 1917 |
| 1,497,242 | Martin | June 10, 1924 |
| 1,935,013 | Burcke | Nov. 14, 1933 |
| 1,957,445 | Coultas | May 8, 1934 |
| 2,020,851 | Nugen et al. | Nov. 12, 1935 |
| 2,246,880 | Erke et al. | June 24, 1941 |